Figure 1:
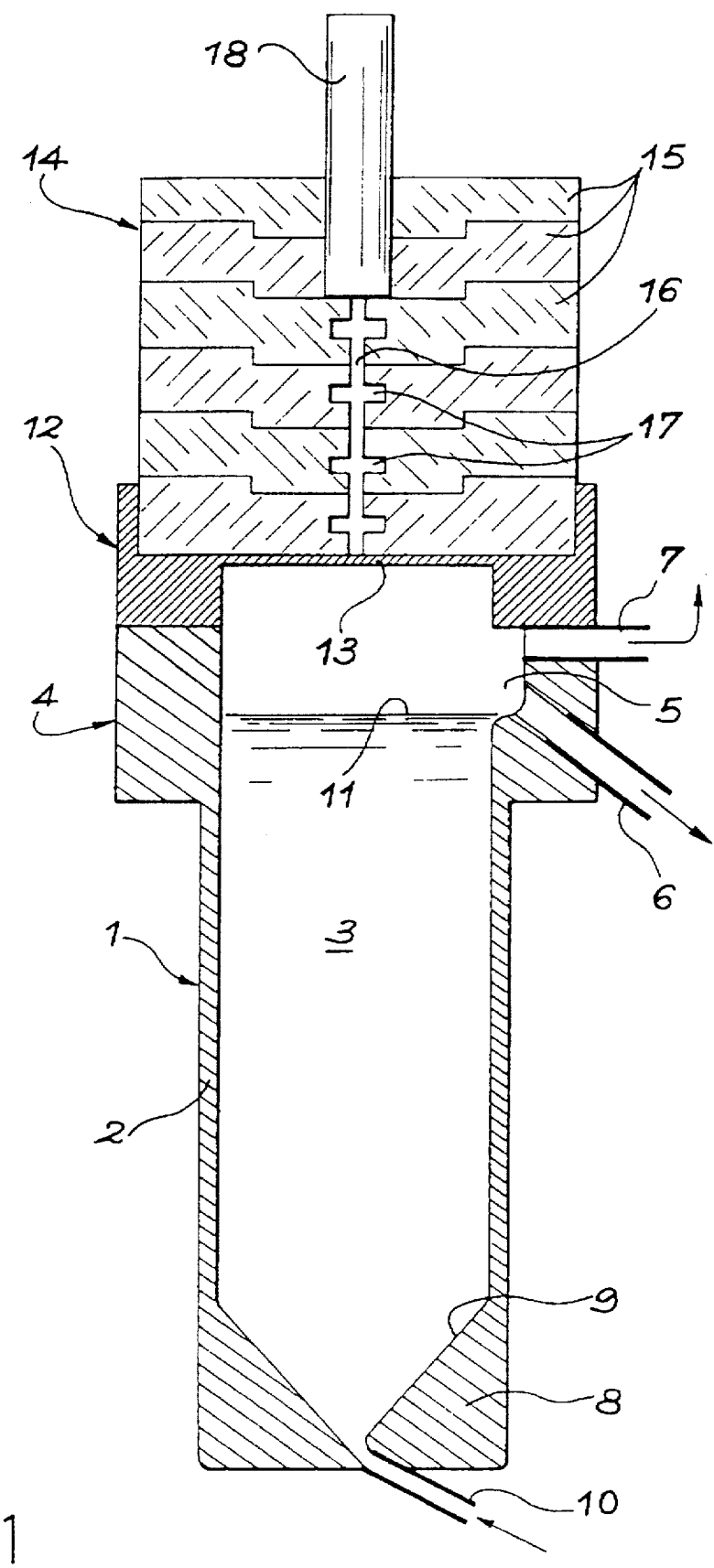

United States Patent [19]

Marteau et al.

[11] Patent Number: 5,726,452
[45] Date of Patent: Mar. 10, 1998

[54] CELL FOR THE ANALYSIS OF RADIOACTIVE LIQUIDS BY AN OVERHANGING DETECTOR

[75] Inventors: Claude Marteau, Avignon; Marcel Durand, Bollene, both of France

[73] Assignee: Compagnie Generale des Matieres Nucleaires, Velizy-Villacoublay, France

[21] Appl. No.: 644,943

[22] Filed: May 13, 1996

[30] Foreign Application Priority Data

May 23, 1995 [FR] France .................................. 95 06116

[51] Int. Cl.$^6$ ................... G01T 1/20; G01T 7/08
[52] U.S. Cl. ......................... 250/364; 250/432 R
[58] Field of Search ..................... 250/364, 432 R, 250/435, 431; 376/310

[56] References Cited

U.S. PATENT DOCUMENTS 3,129,334 4/1964 Loflin et al. .
3,790,804 2/1974 Hunt .
4,532,103 7/1985 Kitaguchi et al. ................. 250/364
5,276,332 1/1994 Marteau et al. .

FOREIGN PATENT DOCUMENTS 545780 6/1993 European Pat. Off. .

*Primary Examiner*—David P. Porta
*Assistant Examiner*—Richard Hanig
*Attorney, Agent, or Firm*—Pearne, Gordon, McCoy & Granger LLP

[57] ABSTRACT

Cell, whose interior (3) is filled with liquid, whose radioactivity is measured by a scintillator or other detector install thereon. The invention consists of equipping the cell with rinsing means in order to wash the cell side wall (2) and the sealing or blanking plate (13) with respect to impurities deposited thereon and interfering with the measurement as a result of their natural radioactivity. Blowing means are provided above the free surface of the radioactive liquid in order to oppose its vaporization, which would produce other deposits.

15 Claims, 3 Drawing Sheets

CELL FOR THE ANALYSIS OF RADIOACTIVE LIQUIDS BY AN OVERHANGING DETECTOR

DESCRIPTION

The invention relates to a cell for analyzing radioactive liquid by means of an overhanging detector.

It is of a known type in which the volume of the cell is filled from the bottom. The liquid to be analyzed rises to just below the top of the cell and which is, in known constructions, fixed by an overflow pipe, which issues into the internal volume and consequently enables the excess liquid to pass out of the same. The cell is closed at the top by a thin sealing plate, which is permeable to radiation and behind which is placed the detector, which is generally sensitive to gamma rays and collimated.

The disadvantage of such cells results from deposits of radioactive particles, whose influence is superimposed on that of the liquid and interferes with the measurements. These particles are deposited and finish up by incrusting on the cell side wall, particularly level with the liquid surface in order to form there a contamination ring. Other deposits are encountered on the surfaces of the overflow pipe and the cavity of the side wall into which said pipe issues, and deposits are even found above the liquid level on the upper, lateral portion of the cell and up to the horizontal surface of the sealing plug and the surface of the vent pipe issuing into the side wall above the overflow pipe. Such supplementary deposits are due to possible splashing with certain liquids in emulsion and vapour condensations. The invention aims at improving the known cells by limiting such deposits when the cell is empty.

The essence of the invention consists of rinsing means equipping the cell and designed to wash the entire top surface thereof and the entire lateral surface thereof, without any part of such surfaces being omitted. Means for blowing a gas such as air, more particularly usable during measurements, are added in order to oppose vaporization of the liquid and the accumulation of said contaminated vapour in front of the upper wall of the cell.

Said means can largely be placed on a single part, referred to here as a deflector, which is interposed between the cell envelope, which virtually envelops the entire side wall and the sealing part forming the top wall.

The invention is described in greater detail hereinafter with various arrangements helping a satisfactory implementation of the general means and with reference to the attached drawings, wherein show:

FIG. 1 A general view of the cell in longitudinal section.

Figure 2:
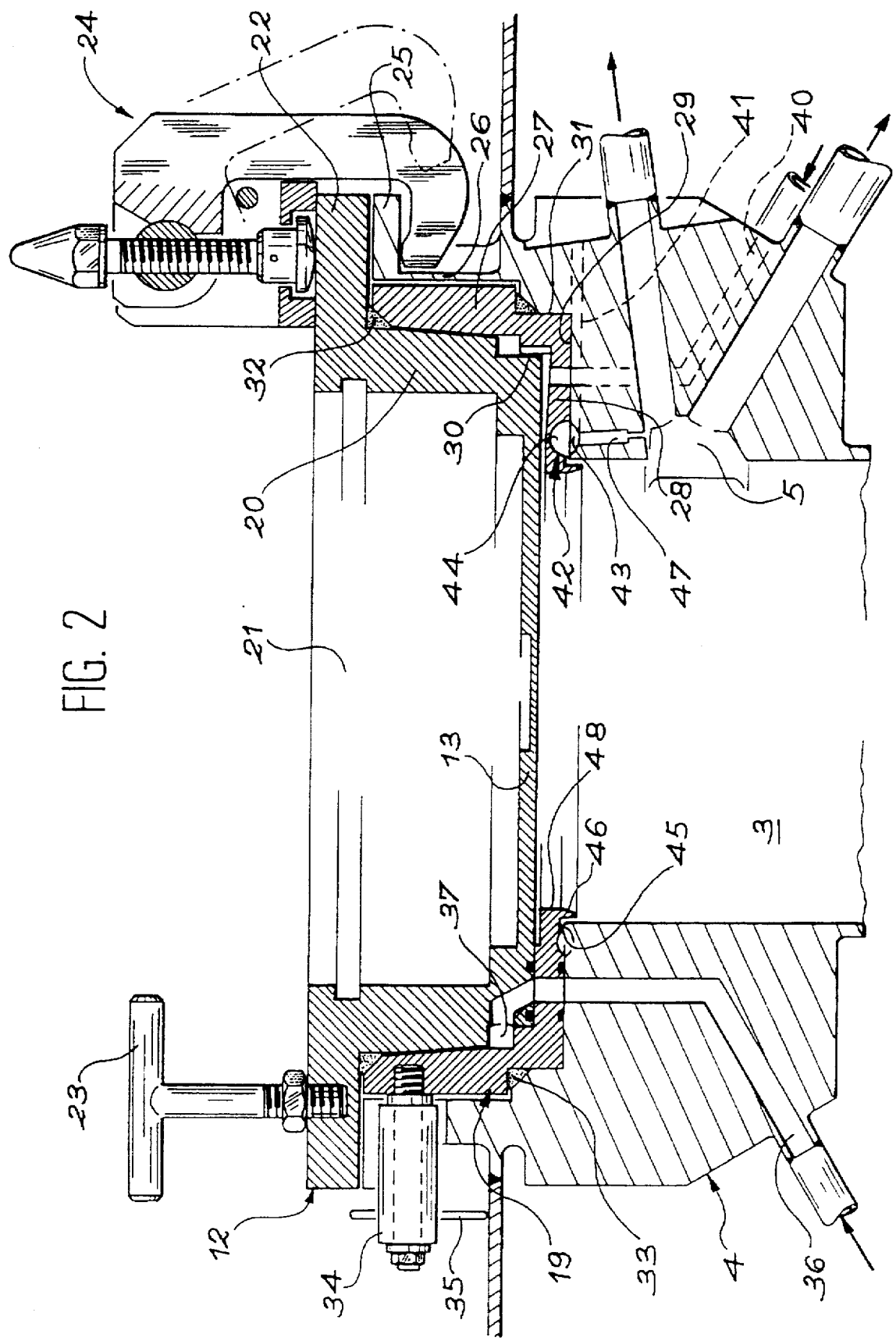

FIG. 2 The top of the cell, in longitudinal section.

Figure 3:
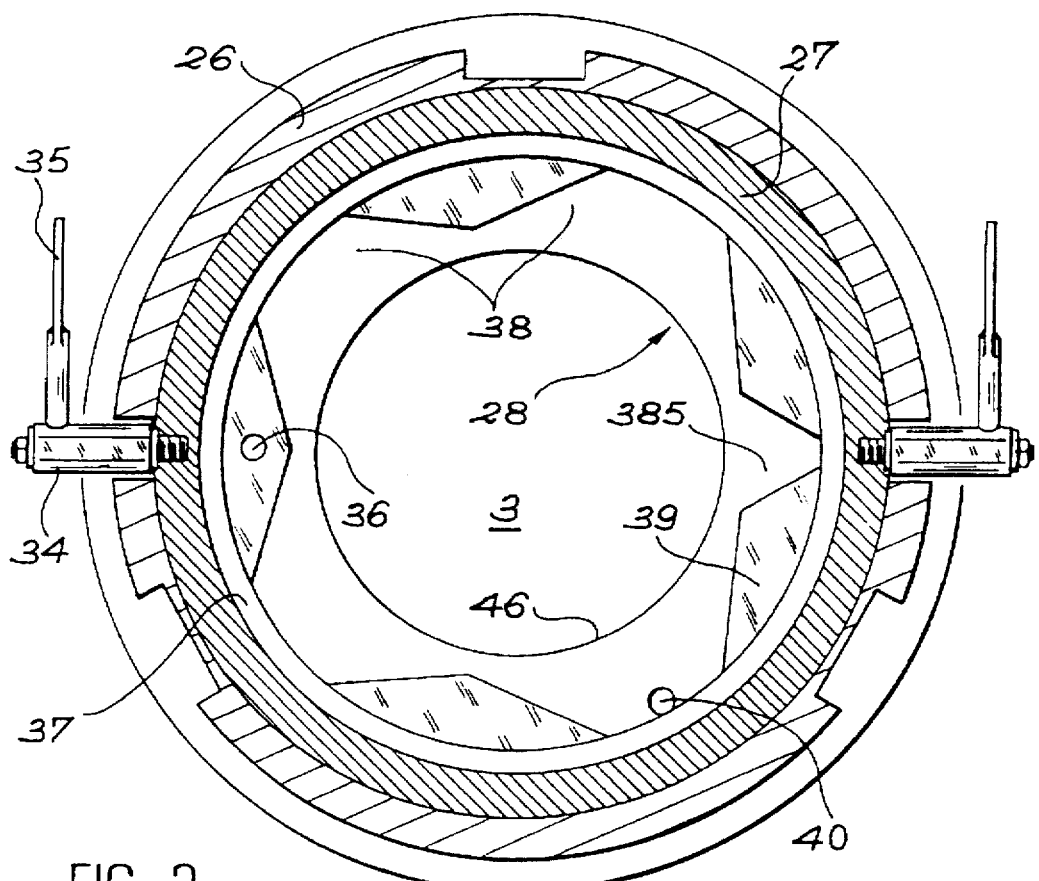
Figure 4:
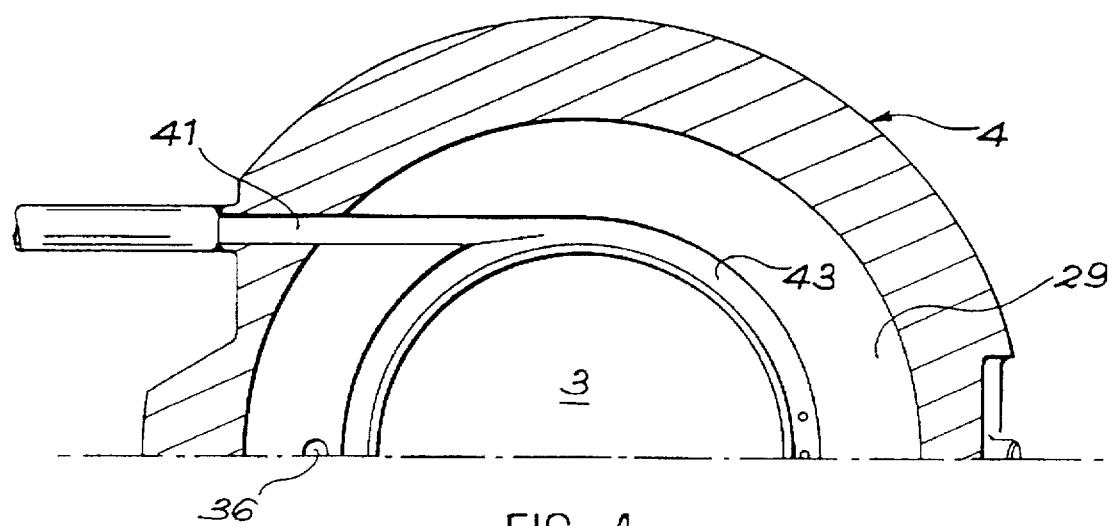

FIGS. 3 & 4 Rinsing and blowing pipes.

The essential structural component of the cell of FIG. 1 is the envelope 1 formed by a cylindrical side wall 2, which envelops most of the internal volume 3 of the cell. The side wall 2 is extended upwards by a clamping portion 4, in which is provided a cavity 5, into which issues the overflow pipe 6 and vent pipe 7, which pass through the envelope 1, which is placed above the former, and at the bottom by a base 8, whose inner surface 9 narrows in funnel-shaped manner and issues into an analysis liquid supply pipe 10 also used for emptying the inner volume 3. Thus, the analysis liquid rises to the level 11 where the overflow pipe 6 issues.

A sealing plug 12 is placed on the top of the clamping portion 4 and essentially comprises a horizontal sealing plate forming a top wall 13 for the internal volume 3. A collimator 14 is placed on the wall 13 and is formed by stacked lead rings 15, which leave a detection pipe 16 widened by chamber intervals 17. A scintillation probe 18 is placed to the rear of the detection pipe 16 and is used for measuring the photon flow rate reaching the same. However, despite the collimator 14, the measurement is rendered erroneous by the aforementioned supplementary radiation occurring as a result of particles deposited on the walls.

The top of the cell can be more clearly seen in FIG. 2, where there is in particular a deflector 19 placed between the clamping portion 4 of the cell envelope 1 and the sealing plug 12. It carries a large proportion of the rinsing and blowing means, which will now be described.

Reference will be made to certain constructional elements falling outside the scope of the invention and more particularly relating to the arrangement and connection of parts of the cell. Thus, the sealing plug 12 has, apart from the top wall 13, a cylindrical border 20 rising above the wall 13, surrounding a pocket 21 in which the base of the collimator 14 is fitted and terminated by an outer collar 22. The latter carries handles 23 for the extraction of the sealing plug 12 and screw clamps 24 which can be engaged against another collar 25 integral with the clamping portion 4, to which it is connected by a border 26. The deflector 19 is formed by a cylindrical border 27 between the borders 20 and 26 of the deflector 12 and the cell envelope 1, and a horizontal ring 28 compressed between the top wall 13 and an also horizontal bearing surface 29 of the clamping portion 4. Centring surfaces 30, 31 of limited height are provided between the border 27, on the edge of the ring 28 and the borders 20 and 26 respectively. Joints 32 and 33 are compressed between the deflector 19 and the sealing plug 12 and the flanging portion 14 in order to maintain the necessary seal. Finally, two studs 34 (both visible in FIG. 3) are screwed onto the deflector 19 and extended by handles 35 to extract the deflector 19 or for assisting in placing it at a given angular position on the clamping portion 4. This is explained by the existence of a subsequently described, rinsing liquid supply pipe 40 and blowing pipe 36 from the exterior of the cell and traversing the clamping portion 14, the ring 28 of the deflector 19 and the bottom of the border 27 of the sealing plug 12 terminating in a groove 37 made between the borders 20, 27 and the sealing plug 12 and the deflector 19 when said two parts are fitted together and more specifically just above the top wall 13. Reference should simultaneously be made to FIG. 3, which is a plan view of the deflector 19, the sealing plug 12 being removed. The upper face of the ring 28 is notched by in this case five trapezoidal cavities 38 and which widen towards the internal volume 3 of the cell, whilst the cavities extend from the ring 28 up to the groove 37. Thus, the sealing plug 12 is only supported by the bearing faces 39 separating the cavities 38. Therefore the top wall 13 serves as the top or roof to the cavities 38. The air from the blowing pipe 36 and directed towards the groove 37 forks in two angular directions and part of it is removed passing in front of each of the cavities 38. This air is blown horizontally and in a both centripetal and divergent flow due to the opening of the cavities 38 and their very limited height. Thus, a flow is obtained which skims the entire surface of the top wall 13, whilst occupying most of the volume above the overflow pipe 6. Contaminated vapours cannot be maintained in such a medium and will be entrained into the vent pipe 7. All the cavities 38 are identical, except 38S, which is diametrically opposite to the blowing pipe 36. The two air streams blown into the groove 37 rejoin there, so that the air is blown under a higher pressure at this location. In order to ensure a roughly regular blowing, it is appropriate for the flow rate to be lower at this point, which explains the narrowness of the cavity 385, which is twice less wide than the others.

The cavities 38, including 385, also have another function. A rinsing liquid supply pipe 40 issues into the bottom of one of them, said pipe 40 being placed through the clamping portion 4 and the ring 28 in the same way as the blowing pipe 36. When the water or other rinsing liquid is sprayed through the pipe 40 it is distributed within the cavity 38 and projected or sprayed into the internal volume 3 washing the entire lower surface of the top wall 13, which it soaks.

There is a supplementary rinsing pipe 41, but whose arrangement is different, because it is only placed through the clamping portion 14 being flush with the bearing surface 39, as shown in FIG. 4, which is a plan view with the deflector 19 removed. The supplementary pipe 41 leads to a circular channel 42 and more specifically to a lower portion 43 thereof, which is formed in the bearing surface 29. The cross-section of said portion is constant, but said circular channel 42 also has an upper portion 44 made in the ring 28 and which has the property of decreasing in cross-section on moving away from the pipe 41. The circular channel 42 is not closed, but instead communicates by its entire perimeter with the internal volume 3 by means of a slot 45 in the deflector 19. The slot 45 is narrower than the circular channel 42. The rinsing liquid from the pipe 41 consequently flows over the entire side wall 2 and it is useful to compensate the flow drop which increases on moving away from the pipe 41 by a corresponding cross-sectional reduction of the circular channel 42, which maintains a satisfactory velocity and an appropriate flow of the liquid over the entire circumference. Thus, the liquid washes the entire side wall 2 up to the funnel 9. It is guided by a member 46 on the deflector 19 and which advances above the side wall 2 extending towards the bottom from the inner edge of the ring 28, thus masking the slot 45 and deflecting downwards the liquid projected out of the circular channel 42.

There is also a part 47 of the pipe 41 connecting the circular channel 42 to the cavity 5. Rinsing liquid is sprayed into it in order to clean the cavity 5 and the inlets of the vent pipe 7 and overflow pipe 6. The aim of eliminating any residual contamination incrusted on the cell surface is therefore fully achieved. The side wall of the cell also has the inner face 48 of the deflector 19, but said face is washed by the liquid from the pipe 40.

We claim:

1. Cell for analyzing radioactive liquid comprising a side wall (2, 48) and a top wall (13) serving as a sealing plug (12) and on which is placed a radioactivity detector (18), the liquid filling a cell volume (3) defined by the walls, characterized in that it is equipped with rinsing means (28, 40, 41, 42, 46), the rinsing means including a rinsing liquid supply pipe (40) passing through the cell and issuing into a rinsing cavity (38) made in the side wall just below the sealing plug (12) and widening towards the cell volume (3), the rinsing means intended to spray rinsing liquid over the entire sealing plug (12) and so that said rinsing liquid flows over the entire side wall (2, 48), as well as blowing means (36, 37, 38) for blowing gas in front of the sealing plug (12).

2. Analysis cell according to claim 1, characterized in that the side wall has a constant or downwardly decreasing diameter.

3. Analysis cell according to claim 1, characterized in that the rinsing means comprise a supplementary, rinsing liquid supply pipe (41) which passes through the cell and issues into a circular channel (42) issuing by a slot (45), whose width is less than that of the channel (42), into the cell volume (3).

4. Analysis cell according to claim 3, characterized in that the channel (42) has a cross-section decreasing on moving away from the supplementary supply pipe (41).

5. Analysis cell according to claim 3, characterized in that it is formed by a cell envelope (1) enveloping virtually the entire side surface (2), a sealing plug (12) incorporating the top wall (13) and a deflector (19) between the cell envelope (1) and the sealing plug (12).

6. Analysis cell according to claim 5, characterized in that the cavities (38) are made in an upper face of the deflector (19).

7. Analysis cell according to claim 5, characterized in that the circular channel (42) is formed in the lower face of the deflector (19).

8. Analysis cell according to claim 7, characterized in that the circular channel is also made in an upper face of the cell envelope (1) in accordance with a channel portion (43) with a uniform cross-section.

9. Analysis cell according to claim 5, characterized in that the deflector is equipped with a circular member (46) advancing above the side wall (2) of the cell envelope (1) and directed towards the bottom and covering the slot (45).

10. Analysis cell according to claim 1, characterized in that it comprises an additional, rinsing liquid supply pipe (47) passing through the cell and issuing at a reinforcement (5) of the side wall (2) and into which issue the vent pipe (7) or overflow pipe (6).

11. Analysis cell according to claim 10, characterized in that the additional supply pipe (47) emanates from the circular channel (42).

12. Analysis cell according to claim 1, characterized in that the blowing means incorporate at least one blowing pipe (36), which passes through the cell and issues into at least one blowing cavity (38) made in the side wall (48).

13. Assembly cell according to claim 12, characterized in that there are several blowing cavities, one of which coincides with the rinsing cavity.

14. Assembly cell according to claim 13, characterized in that there is a single blowing pipe (36), which issues into the blowing cavities (38) by a distributor formed by a groove (37) surrounding the blowing cavities.

15. Assembly cell according to claim 14, characterized in that there is an uneven number of blowing cavities and that one of them (385), diametrically opposite to the blowing pipe (36) on the cell, is narrower than the other blowing cavities (38).

* * * * *